United States Patent
Stafford

(10) Patent No.: US 7,351,176 B1
(45) Date of Patent: *Apr. 1, 2008

(54) LINE-TO-LUBE PRESSURE REGULATOR VALVE ASSEMBLY

(75) Inventor: Maura Jane Stafford, Warner Robins, GA (US)

(73) Assignee: Sonnax Industries, Inc., Bellows Falls, VT (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/093,435

(22) Filed: Jul. 15, 2005

Related U.S. Application Data

(60) Provisional application No. 60/556,690, filed on Mar. 29, 2004.

(51) Int. Cl.
*F16H 47/06* (2006.01)
(52) U.S. Cl. ...................................... 475/127; 74/732.1
(58) Field of Classification Search .................. 475/63; 477/52, 53, 168; 60/360, 468; 137/115.18, 137/115.2
See application file for complete search history.

(56) References Cited

U.S. PATENT DOCUMENTS 6,712,726 B1  3/2004  Jackson et al. ............. 475/127
6,776,736 B1 *  8/2004  Stafford et al. ............. 475/127
6,826,908 B1  12/2004  Stafford ....................... 60/357
2004/0138025 A1 *  7/2004  Yamaguchi et al. ........ 477/156

\* cited by examiner

*Primary Examiner*—Richard M. Lorence
*Assistant Examiner*—Edwin A Young
(74) *Attorney, Agent, or Firm*—Clifford F. Rey

(57) ABSTRACT

A line-to-lube pressure regulator valve assembly for an automatic transmission including an internal check valve that opens in the Park gear range and at low engine speeds to feed line pressure to the torque converter in response to a substantially lower hydraulic fluid pressure than is required to open the pressure regulator valve in its factory specified operating range. As engine speed increases and sufficient hydraulic fluid pressure is built up within the torque converter charge circuit, the present internal check valve is again closed and the pressure regulator valve assembly opens as it would normally to feed line pressure to the torque converter directly. When the engine is shut off, the present internal check valve is biased to a closed position preventing transmission fluid from draining back through the valve to the transmission sump thereby eliminating the converter drain back problem.

12 Claims, 8 Drawing Sheets

LINE-TO-LUBE PRESSURE REGULATOR VALVE ASSEMBLY

CROSS-REFERENCE TO RELATED APPLICATION

This application claims the benefit under 35 U.S.C.§ 119(e) of U.S. Provisional Patent Application No. 60/556,690 filed Mar. 29, 2004, entitled Line-to-Lube Pressure Regulator Valve.

BACKGROUND OF INVENTION

The present invention relates to automatic transmission systems and, more particularly to an improved pressure regulator valve for General Motors 4L80E automatic transmissions (hereinafter "GM transmissions") dating from 1999 to the present.

Automatic transmission systems of the prior art have a hydraulic circuit sub-system which includes at least a hydraulic pump, a valve body having fluid conducting passages or circuits, input and exhaust ports formed within the fluid circuits, and a plurality of spool valves so-called because of their resemblance to sewing thread type spools. Such valves are comprised of cylindrical pistons having control diameters or spools formed thereon, which alternately open and close the ports to regulate the flow and pressure of automatic transmission fluid (hereinafter "ATF") within the fluid circuits to actuate various components of the transmission. It will be understood that in describing hydraulic fluid circuits, ATF usually changes names when it passes through an orifice or control valve in a specific circuit.

Pumps in automatic transmission systems are generally positive displacement pumps driven by the engine of the vehicle wherein the transmission is installed. A positive displacement pump is one, which has the same output per revolution regardless of pump speed or pressure already developed in the system. Thus, it is necessary to regulate ATF pressure so it does not get too high and damage other components. In the GM transmissions a pressure regulator valve employs a piston and a spring that compresses at a specific pressure to allow some ATF to flow back to the pump reservoir or sump bypassing the hydraulic circuit and reducing pressure. By using a pressure regulator valve with a compression spring calibrated to a pressure lower than the pump's output, a constant ATF pressure can be maintained in the hydraulic system during operation.

When the engine of the vehicle is turned off, ATF contained within the torque converter during operation gradually drains back to the fluid sump. At initial engine start-up this can result in an insufficient fluid level in the torque converter to operate the vehicle. In addition, the original equipment manufacture (hereinafter "OEM") pressure regulator valve in the GM transmissions does not send sufficient line pressure from the pump output circuit into the torque converter charge circuit in the Park gear range or at idle speed to refill the torque converter to permit instant operation of the vehicle at engine start-up.

DESCRIPTION OF RELATED PRIOR ART

One example of a pressure regulator valve including an internal check valve that passes transmission fluid from the hydraulic pump in an amount sufficient to fill the torque converter at low engine speeds is disclosed in U.S. Pat. No. 6,712,726 to Jackson et al. and is commonly owned by the assignee, Sonnax Industries, Inc., of the present invention. However, the Lube Regulated Pressure Regulator Valve disclosed in the Jackson et al. patent ('726) has substantial structural distinctions and is limited to use with CHRYSLER transmissions.

Another example of a pressure regulator valve assembly for an automatic transmission that provides continuous hydraulic fluid flow into the torque converter charge circuit in all operating modes to prevent torque converter overheating is disclosed in U.S. Pat. No. 6,826,908 to Stafford and is also commonly owned by the assignee, Sonnax Industries, Inc., of the present invention. This pressure regulator valve assembly includes an encapsulated ball bearing type check valve. However, the valve assembly disclosed in the Stafford ('908) patent has substantial structural and functional differences and is limited to use with FORD transmissions.

While these devices fulfill their respective, particular objectives and requirements, the aforementioned patents do not disclose the Line-to-Lube Pressure Regulator Valve of the present invention, which substantially departs from the conventional concepts and designs of the prior art.

SUMMARY OF THE INVENTION

Accordingly, the present invention is a Line-to-Lube Pressure Regulator Valve for the GM transmissions including an internal check valve that opens in the Park gear range and at low engine speeds to feed line pressure to the torque converter in response to a substantially lower hydraulic fluid pressure than is required to open the pressure regulator valve in its factory specified operating range. As engine speed increases and sufficient line pressure is built up within the torque converter charge circuit, the internal check valve is again closed and the pressure regulator valve opens as it would normally to feed line pressure to the torque converter directly. When the engine is shut off, the internal check valve is biased to a closed position preventing ATF from draining back through the valve to the transmission sump thereby eliminating the aforementioned converter drain back problem.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
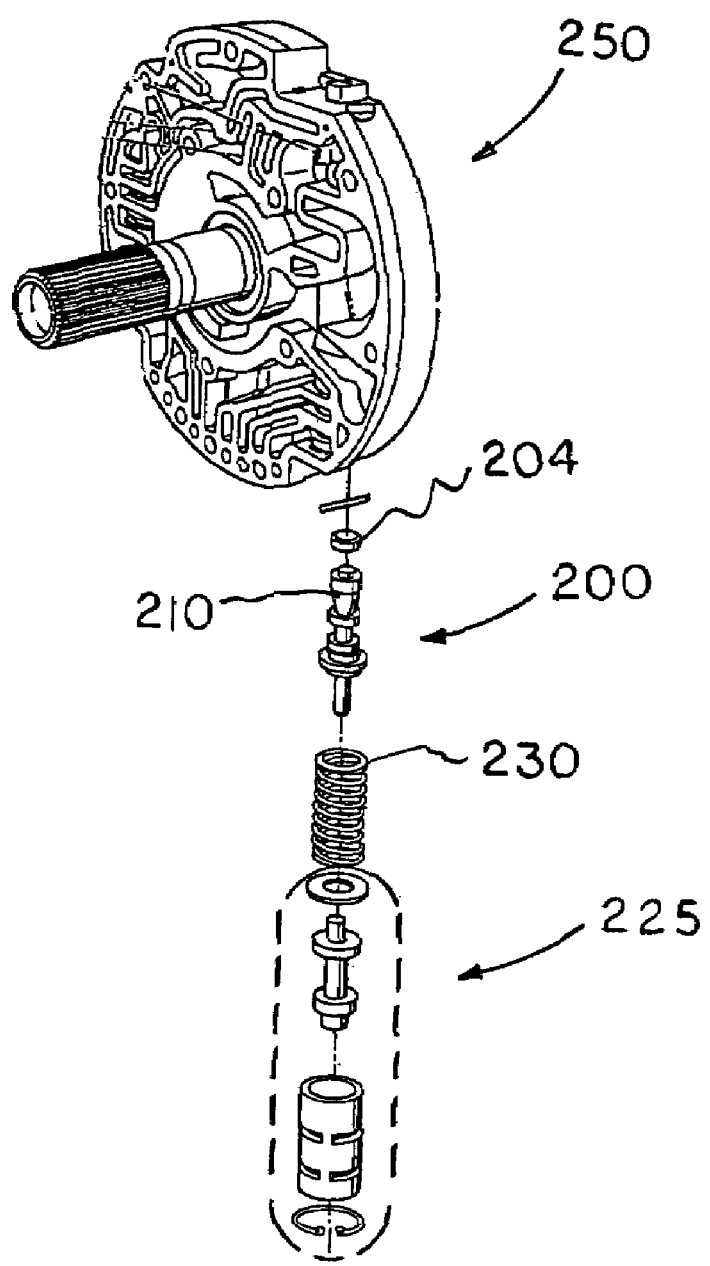
FIG. 1 is an exploded perspective view of the hydraulic pump assembly of a GM 4L80E transmission showing the location of the Pressure Regulator Valve and is labeled Prior Art.

Prior to describing the present invention in detail it may be beneficial to review the function of a pressure regulator valve within the hydraulic system of the GM 4L80E automatic transmission. Referring to FIG. 1 there is shown a perspective view of the relevant portion of the hydraulic system i.e. the pump, indicated generally at 250, of the GM transmission wherein the OEM pressure regulator valve, indicated generally at 200, is located.

In order to pressurize the volume of fluid that the pump 250 delivers to the hydraulic system, the pressure regulator valve 200 operates in conjunction with the reverse boost valve assembly, indicated generally at 225, to regulate line pressure in relation to vehicle operating conditions. The primary restricting component that is used to control line pressure is the pressure regulator valve 200.

Figure 2:
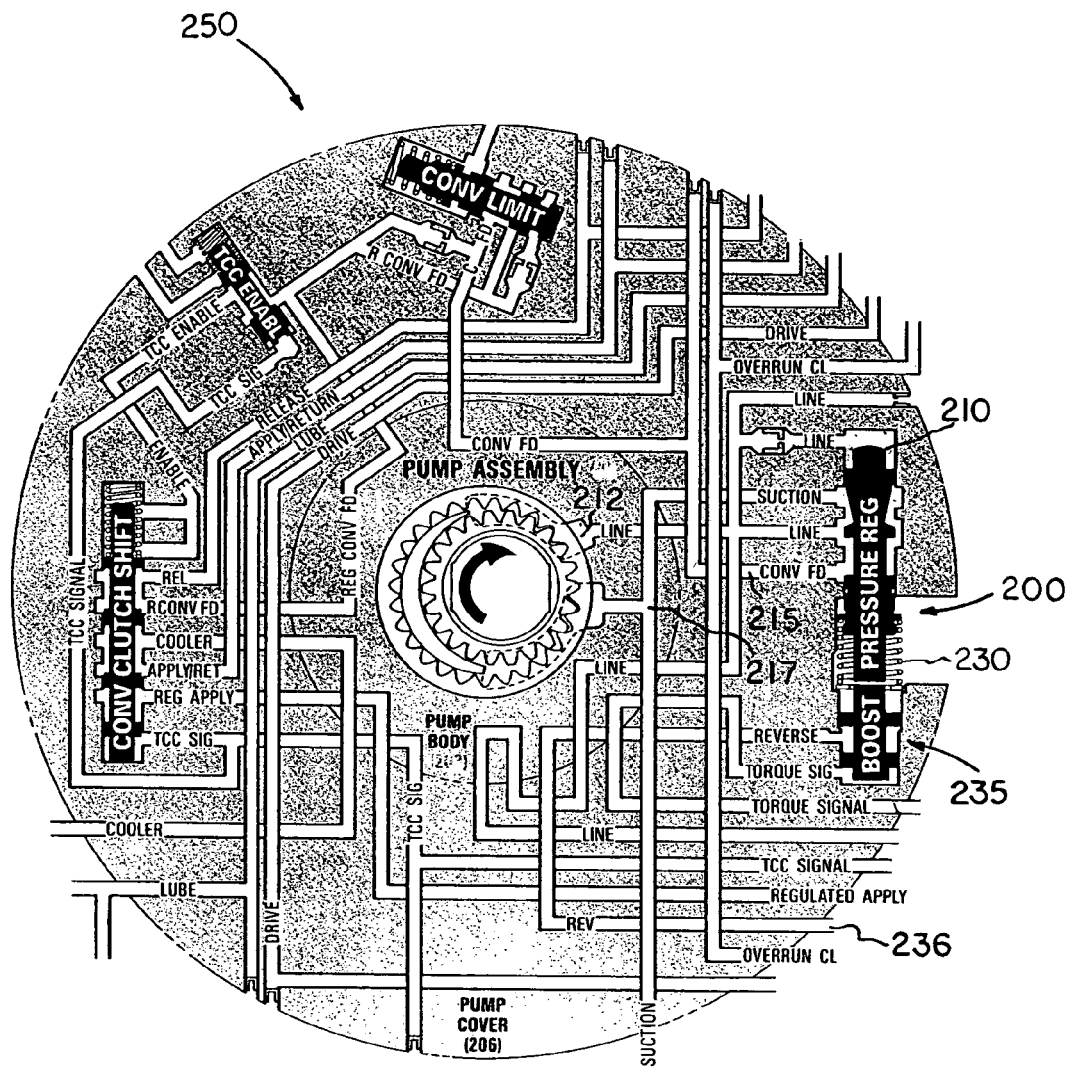
FIG. 2 is a schematic view of the hydraulic pump assembly showing the internal hydraulic circuits in relation to the Pressure Regulator Valve and is labeled Prior Art.

In operation ATF at line pressure from the hydraulic pump 250 is delivered via pump outlet circuit 212 to the top of the pressure regulator valve 200 as shown in FIG. 2. When line pressure builds to the level of 60 to 75 pounds per square inch (psi), the OEM pressure regulator valve 200 moves against the force of the pressure regulator spring 230 (i.e. downwardly in FIG. 2) routing ATF into the torque converter charge circuit as at 215. Line pressure continues to increase until the pressure regulator valve travels far enough against the calibrated spring 230 to force open the suction circuit 217 to line pressure. This allows excess line pressure to feed into the suction circuit 217 back to the pump 250. In this manner pump output capacity is regulated to maintain a consistent ATF pressure in order to operate the transmission properly.

Line pressure is regulated in a similar manner during Reverse gear operation. When Reverse gear is selected, reverse fluid feeds the reverse boost valve assembly, indicated generally at 235, which actuates the pressure regulator valve 200 to deliver increased fluid pressure to the reverse apply circuit 236.

Figure 3:
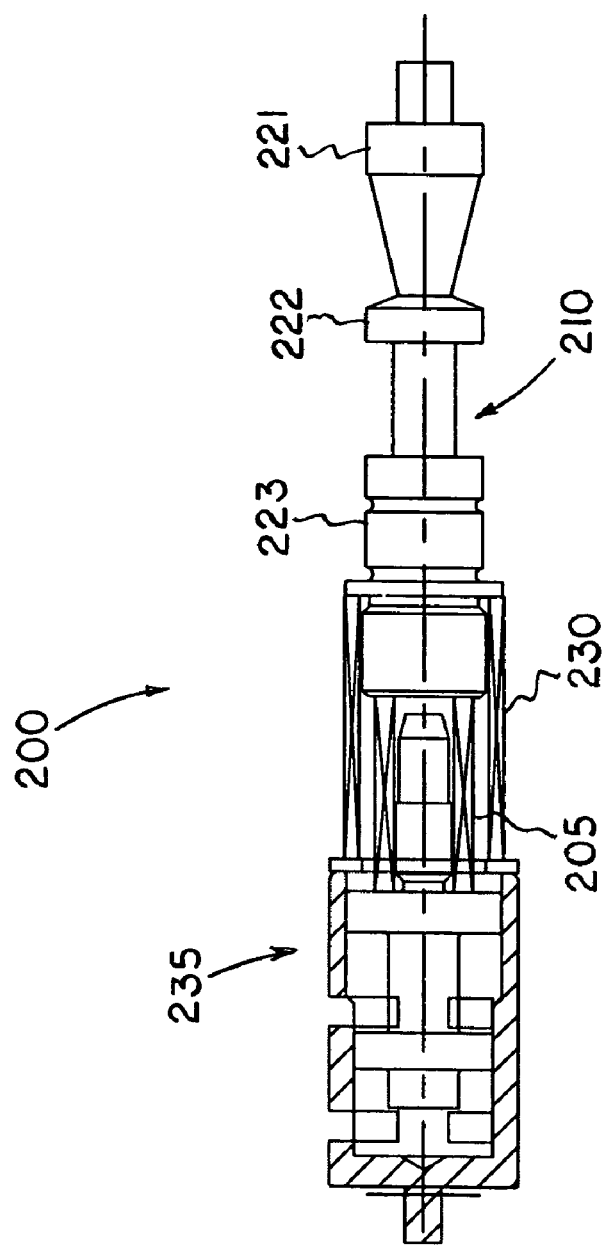
FIG. 3 is a partial cross-sectional view of the OEM pressure regulator valve shown in functional relation to the reverse boost valve assembly and is labeled Prior Art.

As shown more clearly in FIG. 3 the OEM pressure regulator valve 200 comprises a spool valve including a piston member, indicated generally at 210, having a plurality of control diameters or spools 221-223, compression springs 230, 205, and an end plug 204 (FIG. 1) arranged coaxially within the pump body 250 in end-to-end relation with the reverse boost valve assembly 235.

In operation the force of the spring 230 acting on the piston member 210 keeps the pressure regulator valve 200 substantially closed at low engine speed. As engine speed increases and line pressure increases, the force of spring 230 is overcome by line pressure reacting on spool 221 and the piston 210 is stroked to the position shown in FIG. 2 to open the converter charge circuit 215 to feed line pressure to the torque converter (not shown).

When the engine is turned off ATF contained within the torque converter during operation gradually drains back to the transmission sump (not shown) by gravity. Thereafter, at initial engine start up this can result in an insufficient ATF level within the torque converter to drive the vehicle because when the transmission is in Park gear or the engine is idling, the pressure regulator valve 200 will be nearly closed. Thus, the converter charge circuit 215, which delivers ATF to the torque converter does not receive sufficient line pressure to refill the torque converter until the pressure regulator valve 200 opens at approximately 60 pounds per square inch (psi) to release ATF at line pressure from the pump outlet circuit 212 into the converter charge circuit 215.

This problem is particularly evident in the GM transmissions when the vehicle is not driven for a period of a few days or more and all the ATF in the torque converter has drained back to the sump. Thus, the present invention has been developed to provide a line-to-lube pressure regulator valve assembly to correct this problem and will now be described in detail.

Figure 4:
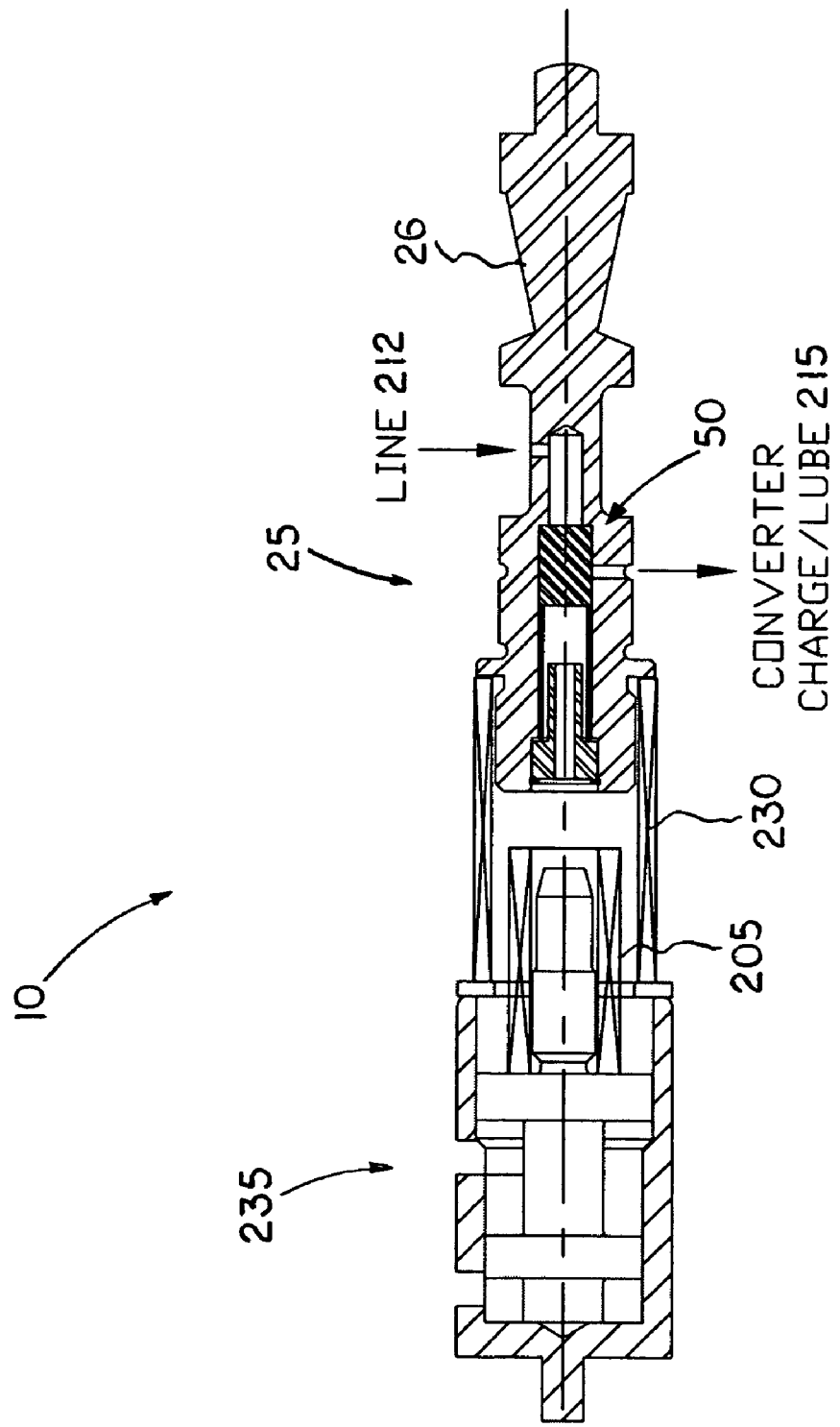
FIG. 4 is a longitudinal cross-section of the Line-to-Lube Pressure Regulator Valve Assembly of the present invention shown in functional relation to the reverse boost valve assembly illustrating the components thereof.

Referring now to FIG. 4 there is shown a Line-to-Lube Pressure Regulator Valve Assembly in accordance with the present invention, indicated generally at 10, which is disposed in end-to-end relation with the OEM reverse boost valve assembly 235. The present valve assembly 10 includes a piston subassembly, indicated generally at 25, wherein the external configuration remains substantially unchanged from that of the OEM valve piston 210.

However, in the present invention the OEM valve piston 210 has been redesigned to provide the present piston subassembly 25 including a modified piston member 26 having an inner valve chamber 30 wherein an internal check valve, indicated generally at 50, is installed. The internal check valve 50 functions to pass ATF at line pressure to the torque converter charge circuit 215 in the Park gear range or at low engine speed as hereinafter explained in detail.

Figure 5:
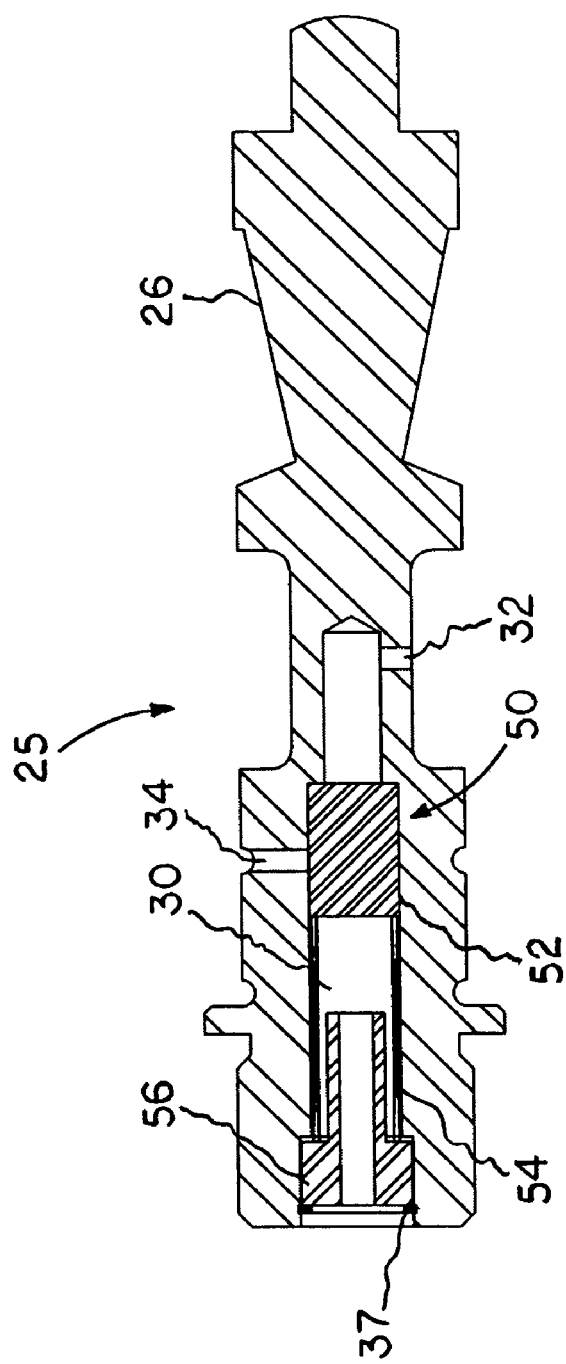
FIG. 5 is an enlarged, longitudinal cross-section of the piston subassembly of the present invention showing the internal check valve in detail.

As more clearly shown in FIG. 5 the present invention provides structures comprising bypassing means including, but not limited to, the structures illustrated for effectively bypassing the pressure regulator valve assembly 10 when it is in the Park gear range or effectively shut off at low engine speed. Such bypassing means includes the internal check valve 50 comprised of a dowel pin 52, a calibrated check valve spring 54, and a vented spring guide 56 arranged coaxially in the bore 30 and secured in place by a retaining clip 37.

In one embodiment dowel pin 52 is fabricated of hardened, alloy steel to predetermined dimensions providing a slip fit within the valve chamber 30 to permit axial shifting movement of the dowel pin. Spring 54 has a low spring rate designed to fully open the check valve 50 at a fluid pressure in the range of 1 to 5 pounds per square inch (psi).

Figure 6:
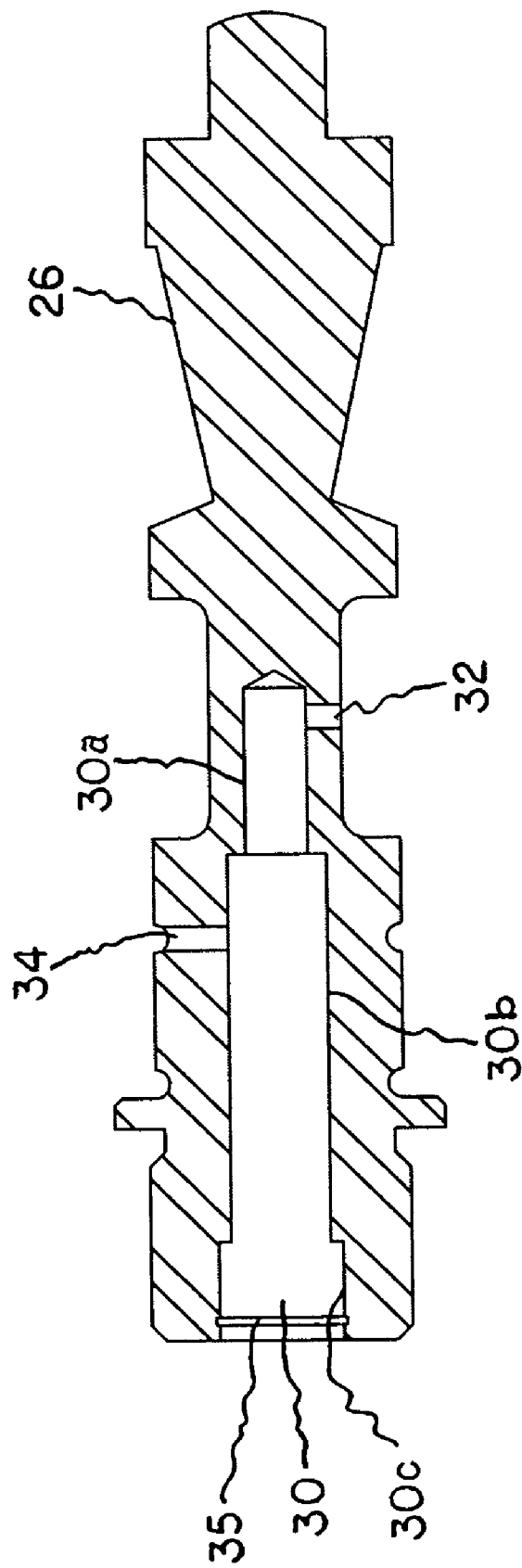
FIG. 6 is a longitudinal cross-section of the piston member wherein the internal check valve has been removed for clarification purposes.
Figure 7:
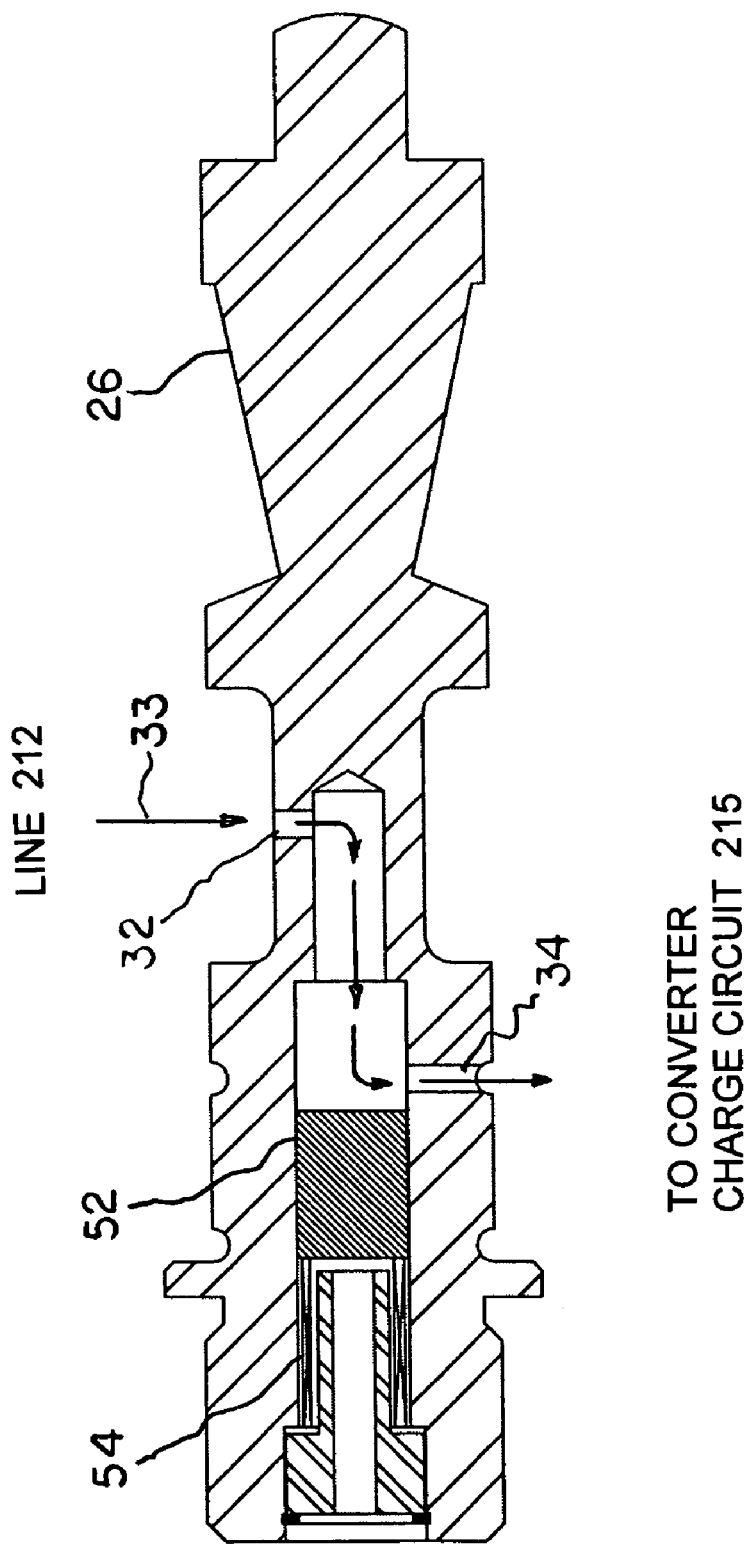
FIG. 7 is a longitudinal cross-section of the piston subassembly of the present invention showing the internal check valve in an open position.

As shown more clearly in FIG. 6 the valve chamber 30 is configured in sections of increasing diameter including a secondary bore 30a, a primary bore 30b, and a counterbore 30c having a retaining clip groove 35 formed therein, which receives the retaining clip 37 (FIG. 5) to secure the present internal check valve 50 in its functional position.

It can be seen that valve chamber 30 includes at least two orifices 32, 34 formed in fluid communication therewith and extending radially outward to the exterior surface of the piston member 26. Orifice 32 is formed in fluid communication with the secondary bore 30a and is positioned to receive ATF at line pressure from the pump outlet circuit as at 212 (FIG. 2). Orifice 34 is formed in fluid communication with the primary 30b and is positioned to deliver ATF to the converter charge circuit 215 within the pump 250 (FIG. 2) when the check valve 50 is opened as hereinafter explained.

In a preferred manufacturing method the piston member 26 including the valve chamber 30 with communicating orifices 32, 34 is fabricated as a new construction by known machining processes. Thereafter, the dowel pin 52, spring 54, and spring guide 56 are arranged coaxially within the valve chamber 30 and retained in position by retaining clip 37 to complete the present line-to-lube pressure regulator valve assembly 25.

In an alternative manufacturing method an OEM pressure regulator valve piston 210 (FIG. 3) may also be machined to convert it into present piston member 26. More particularly, the valve chamber 30 including secondary bore 30a, primary bore 30b, counterbore 30c, retaining clip groove 35, and orifices 32, 34 can be drilled into a preexisting OEM piston 210. Thereafter, the dowel pin 52, spring 54, and spring guide 56 are inserted within the valve chamber 30 and retained in position by retaining clip 37 to complete the conversion to the present valve assembly 25.

In operation the present Line-to-Lube Pressure Regulator Valve Assembly 10 including the internal check valve 50 provides all the functions of the OEM pressure regulator valve 200 and, in addition, supplies increased ATF flow to the torque converter charge circuit 215 at initial engine startup and at low engine speeds.

Figure 8A:
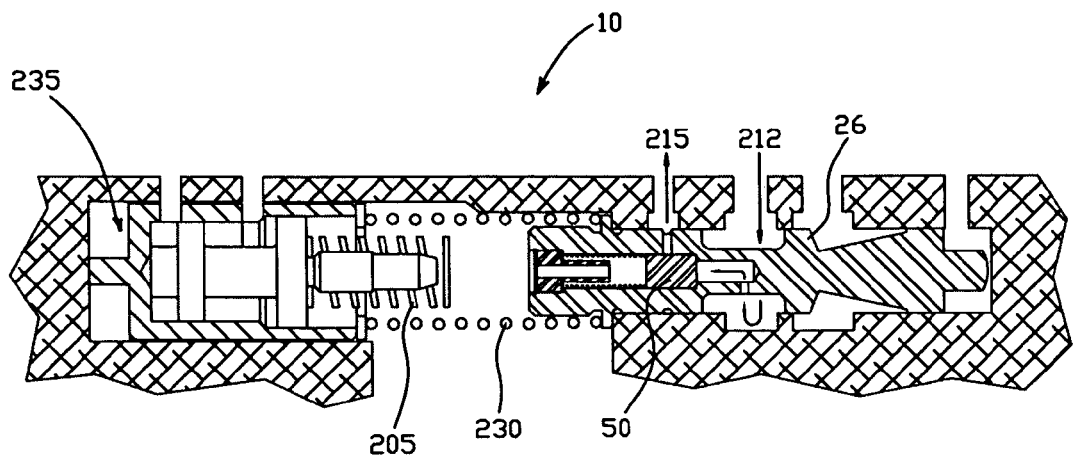
FIG. 8A is a diagrammatic view of the present Line-to-Lube Pressure Regulator Valve in a closed position within the valve body and showing the internal check valve in a closed position.
Figure 8B:
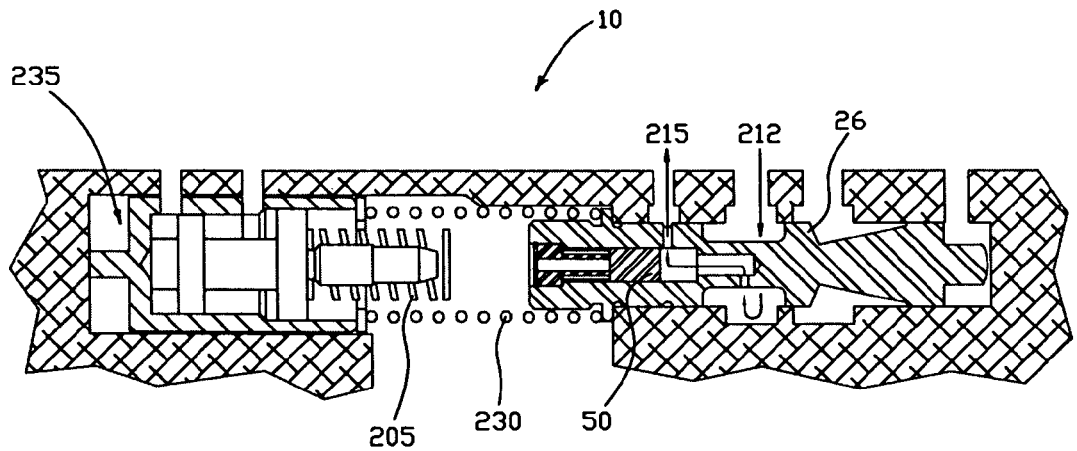
FIG. 8B is a diagrammatic view of the present Line-to-Lube Pressure Regulator Valve in a closed position within the valve body and showing the internal check valve in an open position.
Figure 8C:
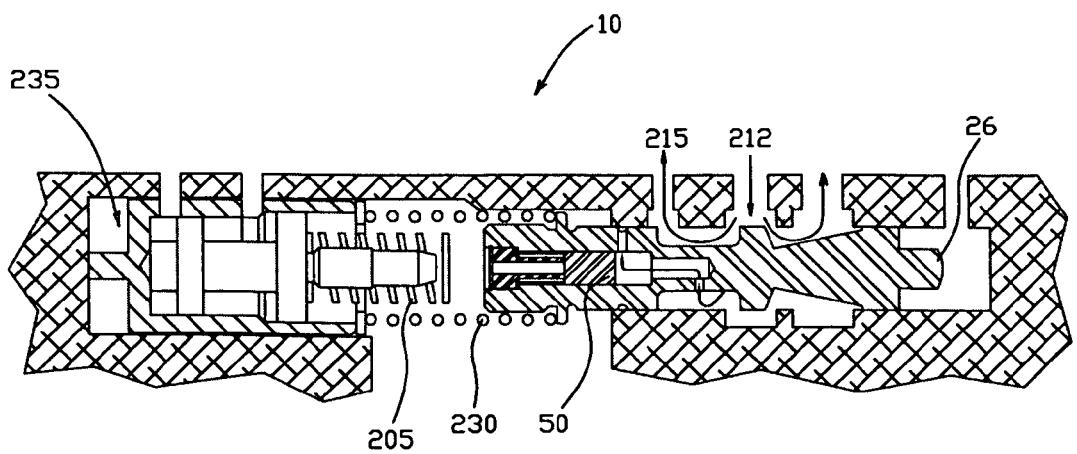
FIG. 8C is a diagrammatic view of the present Line-to-Lube Pressure Regulator in an open position within the valve body and showing the internal check valve in a secondary closed position.

FIGS. 8A-8C illustrate the range of operating positions of the present Line-to-Lube Pressure Regulator Valve 10 including the internal check valve 50 within the pump body 250 in relation to vehicle conditions and/or engine speeds. FIG. 8A shows the present valve assembly 10 when the vehicle engine is shut off. In this position it will be noted that the valve 10 is in a closed position within the pump body 250 and that internal check valve 50 is also in a closed position wherein dowel pin 52 is spring-biased in closed relation to the orifice 34, which prevents ATF within the torque converter charge circuit 215 from draining back through the valve assembly 10 to the sump.

FIG. 8B shows the present valve assembly 10 at initial engine startup and/or low engine speed. In this position it will be noted that the present valve assembly 10 is still in a closed position relative to the pump outlet circuit 212 within the pump body 250 because line pressure has not built up sufficiently to overcome the force of OEM spring 230. However, the internal check valve 50 is in an open position and dowel pin 52 has been stroked (i.e. to the left in the drawing) against the lesser force of spring 54 permitting the flow of ATF in Park gear or at low engine speed to pass through the orifices 32, 34 into the torque converter charge circuit as at 215. Thus, ATF flows to the torque converter at engine idle in an amount sufficient to permit instantaneous operation of the vehicle at startup.

FIG. 8C shows the present valve 10 at high engine speed. In this position it will be noted that the valve assembly 10 shifts to the fully open position and internal check valve 50 is shut down as orifice 34 has moved into closing relation with an adjacent land 250a in the pump body. Of course, at high engine speed some ATF is diverted to the suction side of the pump as at 217 (FIG. 2) to maintain line pressure in the torque converter charge circuit 215 below a factory specified level for the GM transmissions.

Thus, it can be seen that the present Line-to-Lube Pressure Regulator Valve Assembly is a direct replacement for the OEM pressure regulator valve that includes an internal check valve, which provides increased ATF flow into the torque converter charge circuit at initial engine startup. After sufficient line pressure is built up and the present pressure regulator valve opens to feed line pressure to the torque converter charge circuit directly, the internal check valve is closed and the present valve operates in accordance with factory specifications duplicating all of the functions of the OEM valve. When the engine is shut off, the present internal check valve also prevents ATF from draining back from the torque converter through the internal check valve eliminating the converter drain back problem described hereinabove.

Although not specifically illustrated in the drawings, it should be understood that additional equipment and structural components will be provided as necessary and that all of the components described above are arranged and supported in an appropriate fashion to form a complete and operative Line-to-Lube Pressure Regulator Valve Assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A pressure regulator valve assembly for an automotive transmission having a hydraulic pump disposed in fluid communication with a torque converter via a torque converter charge circuit, said pressure regulator valve comprising:
 a valve piston having a plurality of concentric control diameters formed thereon for regulating the flow of automatic transmission fluid from the hydraulic pump to the torque converter;
 a compression spring arranged in coaxial relation to said valve piston, said compression spring biasing said valve piston to a closed position in relation to said torque converter charge circuit; and
 bypassing means integrated within said valve piston, wherein said bypassing means comprises an internal check valve including a cylindrical dowel pin disposed within a valve chamber formed in said valve piston, said dowel pin being spring biased to a closed position in relation to said torque converter charge circuit by a calibrated check valve spring disposed about a vented spring guide positioned in coaxial relation to said dowel pin, said internal check valve releasing hydraulic fluid to the torque converter in response to less hydraulic pressure than is required to open said valve piston against the force of said compression spring.

2. A pressure regulator valve assembly of claim 1 wherein said internal check valve is opened by hydraulic pressure in the range of 1 to 5 pounds per square inch.

3. A pressure regulator valve assembly of claim 2 wherein the force of said compression spring is 60 to 75 pounds per square inch.

4. The pressure regulator valve assembly of claim 1 wherein said internal check valve also functions to prevent the drainage of hydraulic fluid from the torque converter when the hydraulic pump is not operating.

5. An improved pressure regulator valve for an automotive transmission having a hydraulic pump, said pressure regulator valve including a valve piston having a plurality of control diameters formed thereon for regulating the flow of automatic transmission fluid from the hydraulic pump through a torque converter charge circuit to a torque converter of said transmission responsive to pump operating speeds, wherein the improvement comprises:

an internal check valve integrated within said valve piston, said internal check valve being disposed in fluid communication with the hydraulic pump and the torque converter charge circuit, said internal check valve including a cylindrical dowel pin disposed within a valve chamber formed in said valve piston, said dowel pin being spring biased to a closed position in relation to said torque converter charge circuit by a calibrated check valve spring disposed about a vented spring guide positioned in coaxial relation to said dowel pin, said internal check valve opening at low pump speeds in response to lower pressure than is required to open the pressure regulator valve in a factory specified operating range.

6. An improved pressure regulator valve of claim 5 wherein said internal check valve opens responsive to fluid pressure in the range of 1 to 5 pounds per square inch.

7. An improved pressure regulator valve of claim 6 wherein said factory specified operating range of said pressure regulator valve is in the range of 60 to 75 pounds per square inch.

8. An improved pressure regulator valve of claim 5 wherein said internal check valve also functions to prevent drainage of hydraulic fluid from the torque converter when the pump is not operating.

9. An improved pressure regulator valve of claim 5 wherein line pressure is passed through said internal check valve from the hydraulic pump in an amount sufficient to fill the torque converter when the transmission is in a Park gear range.

10. A method for continuously filling a torque converter in an automatic transmission of a motor vehicle operating at low engine speed, wherein the transmission includes a hydraulic pump, a torque converter, and a pressure regulator valve disposed in a valve body of the transmission in fluid communication with the hydraulic pump via a pump output circuit and the torque converter via a torque converter charge circuit, said pressure regulator valve functioning to regulate the flow of automatic transmission fluid from the hydraulic pump to the torque converter responsive to pump operating speed, said method comprising the steps of:

providing a replacement pressure regulator valve including an internal check valve therein comprising a dowel pin being spring biased to a closed position in relation to said torque converter charge circuit by a check valve spring disposed about a vented spring guide positioned in coaxial relation to said dowel pin;

positioning said replacement pressure regulator valve within said valve body such that said internal check valve is disposed in fluid communication with said pump output circuit and said torque converter charge circuit;

opening said internal check valve at low engine speed such that transmission fluid is released to said torque converter via said torque converter charge circuit in response to lower hydraulic pressure than is required to open said pressure regulator valve in a factory specified operating range; and closing said internal check valve at high engine speed when said pressure regulator valve opens in said factory specified operating range.

11. The method of claim 10 wherein the step of providing further includes the steps of:

machining a cylindrical valve chamber in an original equipment manufacture pressure regulator valve piston along a longitudinal axis thereof;

drilling at least one pump outlet orifice and at least one torque converter charge circuit orifice in said valve piston each extending radially from said valve chamber at predetermined axial locations in fluid communication with said pump output circuit and said torque converter charge circuit; and installing said internal check valve into said valve chamber such that said internal check valve is biased to a closed position in relation to said torque converter charge circuit.

12. The method of claim 11 wherein the step of installing further includes the steps of:

inserting a dowel pin into said valve chamber in closing relation to a torque converter charge circuit orifice;

positioning the check valve spring in coaxial relation to said dowel pin;

compressing said check valve spring intermediate said dowel pin and the vented spring guide disposed in coaxial relation to said check valve spring; and capturing said dowel pin, said check valve spring, and said vented spring guide within said valve chamber with a retaining clip.

\* \* \* \* \*